United States Patent
Tsunoda

(10) Patent No.: US 7,388,817 B2
(45) Date of Patent: Jun. 17, 2008

(54) METHOD AND APPARATUS FOR MEASURING HEAD GAP LENGTH OF COMPOSITE HEAD

(75) Inventor: Masahiko Tsunoda, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 772 days.

(21) Appl. No.: 10/856,776

(22) Filed: Jun. 1, 2004

(65) Prior Publication Data
US 2005/0002295 A1 Jan. 6, 2005

(30) Foreign Application Priority Data
Jul. 4, 2003 (JP) ............................. 2003-192060

(51) Int. Cl.
*G11B 7/08* (2006.01)
(52) U.S. Cl. ..................................... 369/47.28; 360/48
(58) Field of Classification Search ............. 369/47.28; 360/48
See application file for complete search history.

(56) References Cited

U.S. PATENT DOCUMENTS 5,715,105 A * 2/1998 Katayama et al. ............ 360/48
5,905,601 A 5/1999 Tsunoda
6,185,058 B1 * 2/2001 Dobbek et al. ............... 360/48
6,421,197 B1 * 7/2002 Abdelnour ................ 360/77.02
6,724,553 B2 * 4/2004 Yun et al. ..................... 360/51

FOREIGN PATENT DOCUMENTS

| JP | 6-349215 | 12/1994 |
|---|---|---|
| JP | 8-315513 | 11/1996 |
| JP | 2002-269703 | 9/2002 |

OTHER PUBLICATIONS

Austrian Search Report dated Sep. 20, 2004, for Application No. 200402983-1 filed May 19, 2004.

* cited by examiner

*Primary Examiner*—Gautam R. Patel
(74) *Attorney, Agent, or Firm*—Pillsbury Winthrop Shaw Pittman, LLP

(57) ABSTRACT

After the read head of a composite head reads sector data from a disk, a read circuit detects a sync mark in the sector data. The read circuit demodulates user data subsequent to the detected sync mark, and outputs it to a disk controller. A sequencer incorporated in the disk controller measures, as a read preamble data length, the data length of preamble data preceding to the detected sync mark. The sequencer determines the head gap length of the composite head from the data length of the preamble data of sector data to be written to the disk, a write path delay, the read preamble data length and a read path delay.

12 Claims, 9 Drawing Sheets

410

| Zone# & Servo# | Split Flag | SG to 1st DSP | 1st Sector Length | Nomal Sector Length | Number of Sectors (#Sec/Servo) | Last Sector Length |
|---|---|---|---|---|---|---|
| 411a | 411b | 411c | 411d | 411e | 411f |  |
|  |  |  |  |  |  |  |

411

| Zone # | Write Clock Freq. | Write Preamble Len. | HG Delay (H0) | HG Delay (H1) |
|---|---|---|---|---|
| 0 | M0 = m0, N0 = n0 | Nw0 | A00 | A10 |
| 1 | M1 = m1, N1 = n1 | Nw1 | A01 | A11 |
| 2 | M2 = m2, N2 = n2 | Nw2 | A02 | A12 |
| 3 | M3 = m3, N3 = n3 | Nw3 | A03 | A13 |
| 4 | M4 = m4, N4 = n4 | Nw4 | A04 | A14 |
| 5 | M5 = m5, N5 = n5 | Nw5 | A05 | A15 |
| 6 | M6 = m6, N6 = n6 | Nw6 | A06 | A16 |
| 7 | M7 = m7, N7 = n7 | Nw7 | A07 | A17 |
| 8 | M8 = m8, N8 = n8 | Nw8 | A08 | A18 |
| 9 | M9 = m9, N9 = n9 | Nw9 | A09 | A19 |

412

Format Table

FIG. 7

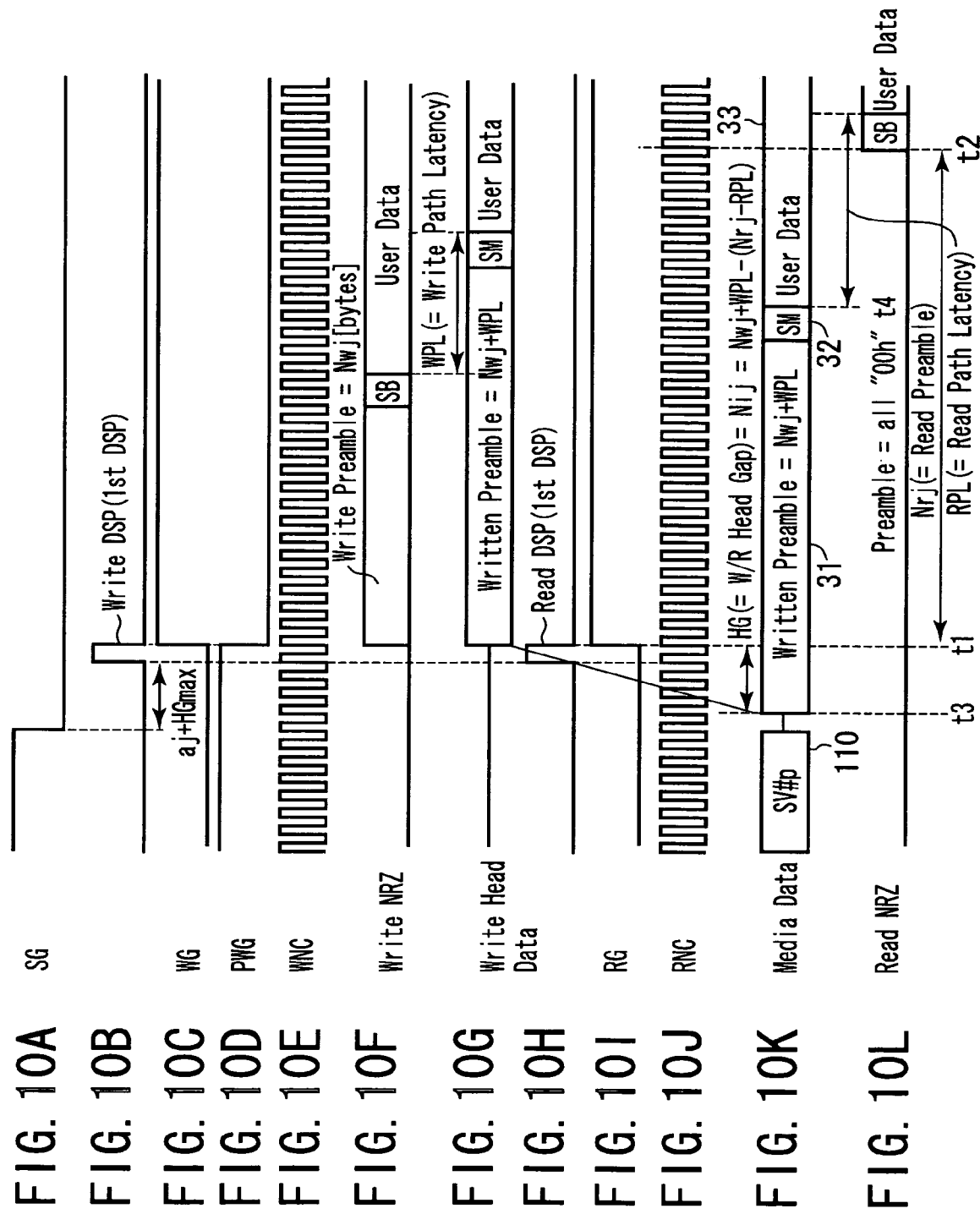

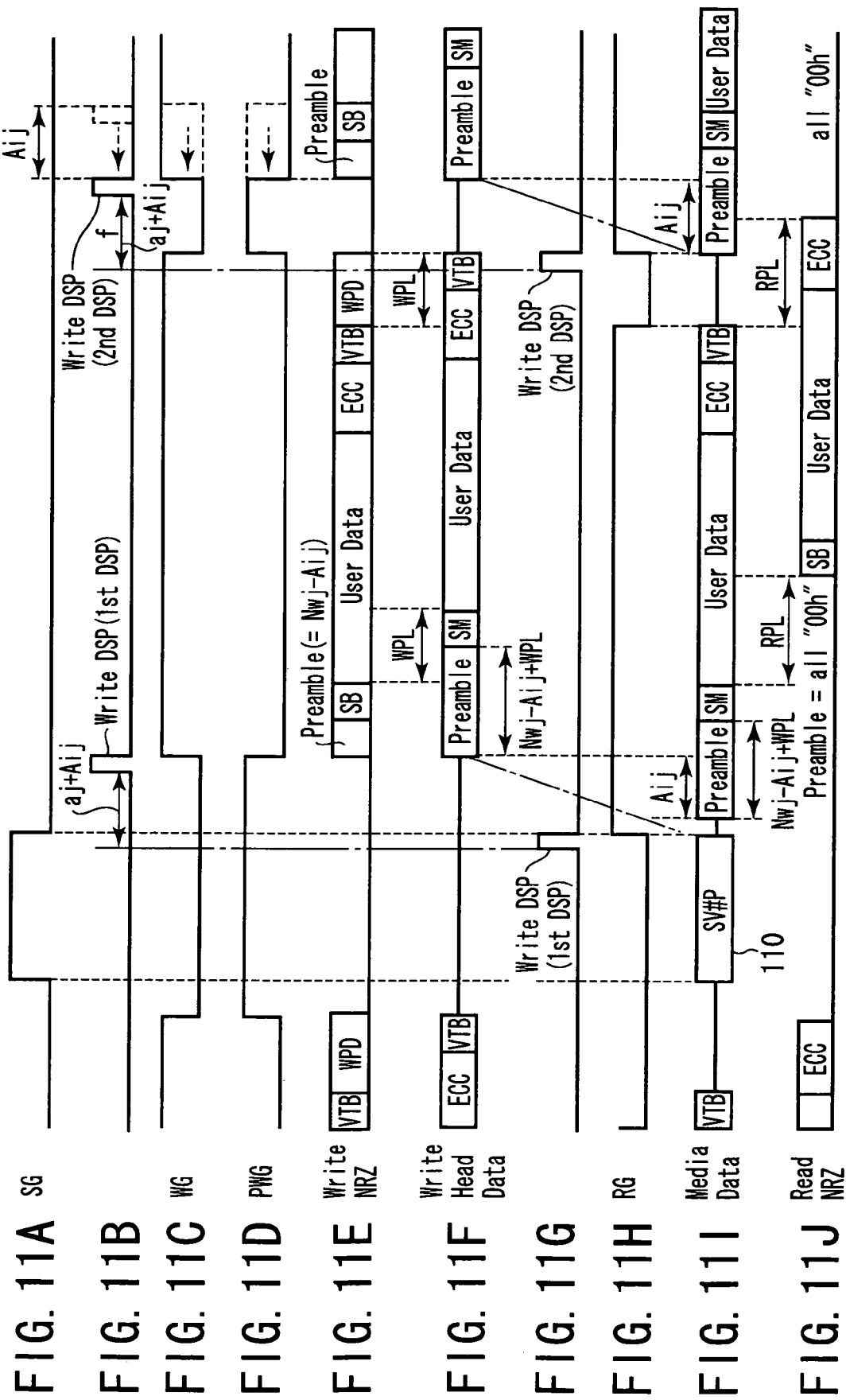

METHOD AND APPARATUS FOR MEASURING HEAD GAP LENGTH OF COMPOSITE HEAD

CROSS-REFERENCE TO RELATED APPLICATIONS

This application is based upon and claims the benefit of priority from prior Japanese Patent Application No. 2003-192060, filed Jul. 4, 2003, the entire contents of which are incorporated herein by reference.

BACKGROUND OF THE INVENTION

1. Field of the Invention

The present invention relates to a disk storage apparatus equipped with a composite head that includes a read head and write head. More particularly, the invention relates to a method and apparatus for measuring the head gap length of a composite head, suitable for realizing a disk format in consideration of the head gap length as the interval between the read and write heads.

2. Description of the Related Art

In general, in disk storage apparatuses, such as hard disk drives (HDDs), there is a demand for enhancement of disk formatting efficiency. In the prior art, however, a signal delay (hereinafter referred to as a "read path delay") in a read circuit (read channel) is considered a bottleneck in the effort to enhance the disk formatting efficiency. This is because the distance (gap) between adjacent data sectors must be set sufficiently wide in order to absorb the read path delay and realize data reproduction of continuous data sectors. In light of this, Jpn. Pat. Appln. KOKAI Publication No. 8-315513, for example, discloses a technique (hereinafter referred to as "first prior art") for dealing with read path delay without widening the gap. The first prior art is characterized in that a reactivation read gate RRG is turned on before a reference read gate RG. In this prior art, a Viterbi decoder and read phase lock loop (PLL) circuit can be reactivated at an earlier stage to perform a pipeline operation.

On the other hand, recent high-recording-density HDDs generally employ a composite head formed of a slider with a read head and write head mounted separately thereon. HDDs with a composite head need to consider the time delay between a read operation by the read head and a write operation by the write head. Jpn. Pat. Appln. KOKAI Publication No. 2002-269703, for example, discloses a technique (herein referred to as "second prior art") for adjusting, using a delay circuit, the output timing of a write gate (write gate signal) WG and read gate (read gate signal) RG. The output timing is adjusted based on the distance (head gap length) between the read head and write head in the circumferential direction of the disk, and the disk data format. During writing, a period T1 ranging from the time corresponding to the end of each servo region on the disk, to the time of generating a write gate WG is set equal to the time delay corresponding to the head gap length. The period T1 is the sum of periods T2 and T3. The period T2 is the difference between the time corresponding to the end of each servo region and the time of generating a data sector pulse DSP. The period T3 is the difference between the time of generating the pulse DSP and the time of generating a write gate WG. On the other hand, during reading, a read gate RG is generated at the time corresponding to the middle point of the spin variation gap (pad data) defined from the end of each servo region. As a result, in the second prior art, the information recorded in the end portion of each servo region (i.e., the end portion of servo data) is prevented from being overwritten by a write operation.

In the first prior art HDD, the problem of read path delay is solved, therefore the disk formatting efficiency depends upon the write data length. On the other hand, in the second prior art, while the information recorded in the end portion of each servo region is prevented from being overwritten, it is not necessary to widen the spin variation gap of the servo region end portion. However, in the second prior art, no consideration is given to the problem concerning write data that is recorded in the end portion of a servo region and has a data length corresponding to the head gap length.

As is apparent, a data format made in light of the common difference in head gaps (i.e., the allowable maximum head gap length) is required to prevent the end portion of servo data from being overwritten by a write operation. However, in accordance with recent increases in the recording density of HDDs, the data length corresponding to the same head gap length has increased compared to the conventional data length. Therefore, the influence of the head gap of a composite head upon the efficiency of formatting (i.e., format loss) has become unignorable.

BRIEF SUMMARY OF THE INVENTION

According to an embodiment of the invention, there is provided a method of measuring a head gap length of a composite head, for use in a disk storage device with the composite head. The composite head includes a read head used to read data from a disk, and a write head separate from the read head in a circumferential direction of the disk and used to write data to the disk. The disk employs a disk format wherein servo regions for recording servo data are dispersively arranged at regular intervals in the circumferential direction of the disk, and a region between a pair of adjacent ones of the servo regions is assigned as a data region in which a plurality of data sectors are arranged. The method comprises: modulating user data to be written to the disk, using a write circuit; writing, to the disk, sector data containing preamble data, a sync mark and the modulated user data, using the write head of the composite head; reading the sector data from the disk, using the read head of the composite head; detecting the sync mark in the sector data read by the read head, using a read circuit; demodulating the user data contained in the sector data read by the read head, using the read circuit, the user data being subsequent to the sync mark; measuring a data length of the preamble data as a read preamble data length, the read preamble data length corresponding to a period ranging from a time at which a read gate signal which designates a period of reading the sector data from the disk is asserted, to a time at which the read circuit detects the sync mark; and determining the head gap length of the composite head based on the measured read preamble data length, a write preamble data length, a write path delay and a read path delay, the write preamble data length being a data length of the preamble data contained in the sector data to be written to the disk, the write path delay being a data length corresponding to a signal delay time in the write circuit, the read path delay being a data length corresponding to a signal delay time in the read circuit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 shows a data configuration example stored in the format table 410 appearing in FIG. 1;

FIGS. 10A to 10L are timing charts illustrating various signals related to the head gap length (HG length) detection; and FIGS. 11A to 11J are timing charts illustrating various signals related to normal data reading and writing.

DETAILED DESCRIPTION OF THE INVENTION

Figure 1:
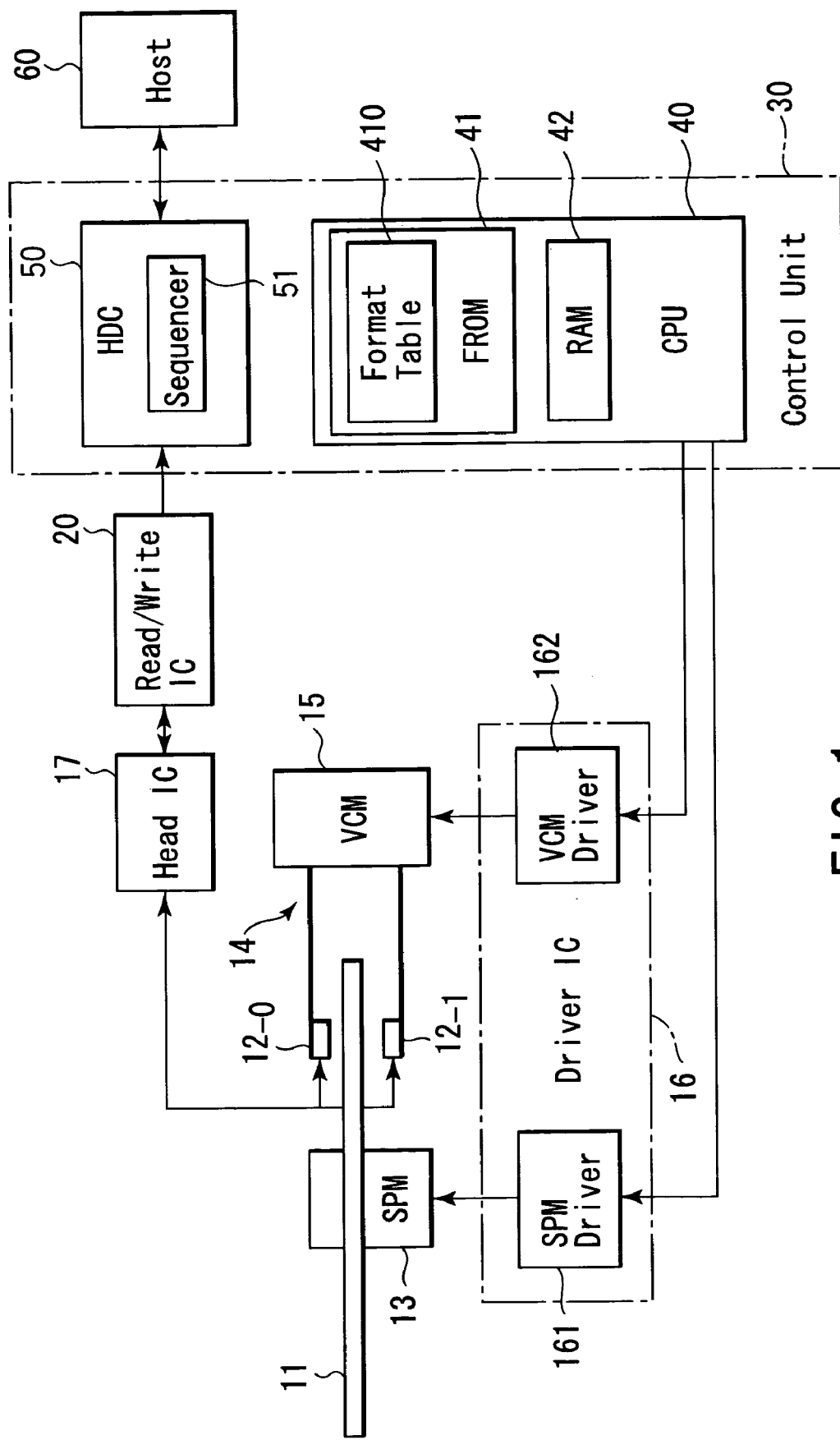
FIG. 1 is a block diagram illustrating the configuration of a hard disk drive according to an embodiment of the invention.

An embodiment in which the invention is applied to a hard disk drive will be described in detail with reference to the accompanying drawings. FIG. 1 is a block diagram illustrating the configuration of a hard disk drive (hereinafter referred to as an "HDD") according to the embodiment of the invention. As shown in FIG. 1, a disk (magnetic disk) 11 has upper and lower disk surfaces. At least one, both in this embodiment, of the disk surfaces serves as a recording surface on which data is magnetically recorded. Heads (magnetic heads) 12-0 (H0) and 12-1 (H1) are provided for the respective recording surfaces of the disk 11. In the configuration of FIG. 1, it is assumed that the HDD has a single disk 11. However, the HDD may have a plurality of disks stacked on each other.

The head 12-i (H1) (i=0, 1) is a composite head formed of a slider with a read head 121 and write head 122 (see FIG. 5) mounted thereon separately. The head 12-i is, for example, a magnetoresistive head (MR head). The read head (read element) 121 is a magnetoresistive element (MR element), while the write head (write element) 122 is an inductive thin-film element. The distance between the read and write heads 121 and 122 in the circumferential direction of the disk 11 is called a head gap (HG), and the length of the head gap is called a head gap length. In this embodiment, however, the head gap length indicates the data length (or time) corresponding to the distance between the read and write heads 121 and 122 in the circumferential direction of the disk 11, as will be described later.

Figure 2:
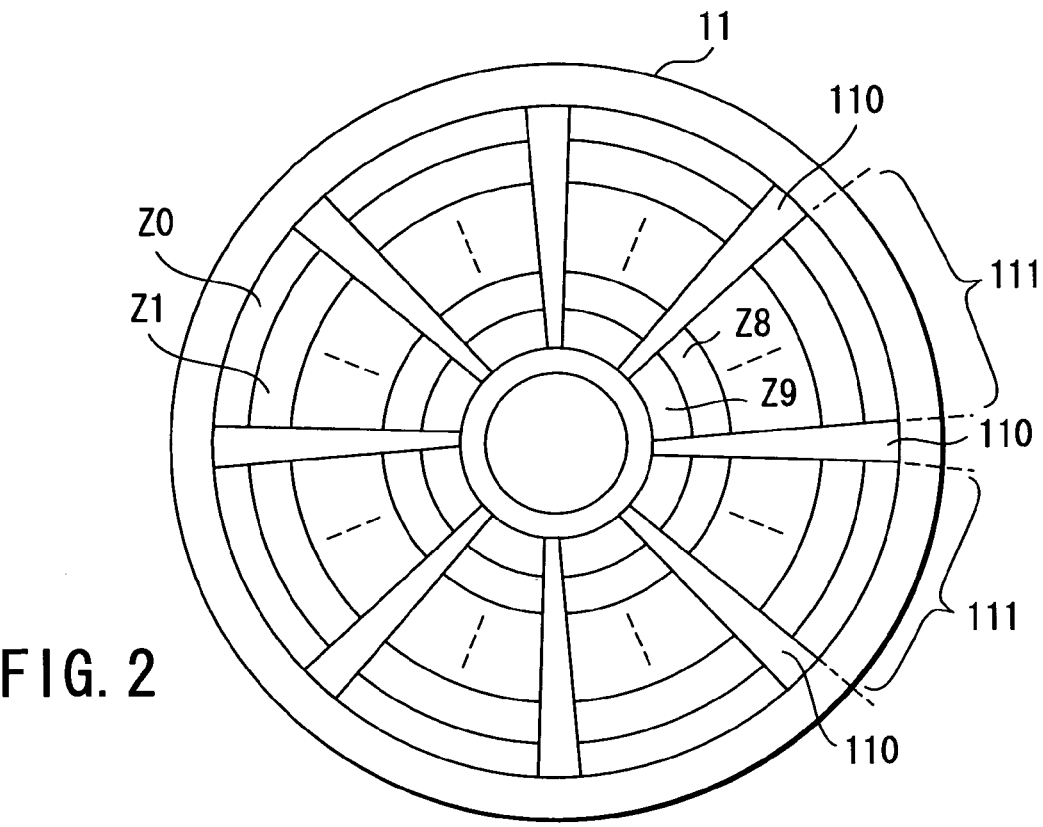
FIG. 2 is a view illustrating the format of the disk 11 appearing in FIG. 1.

FIG. 2 shows the format of the disk 11. As seen from FIG. 2, on each recording surface of the disk 11, a plurality of servo regions 110 are arranged circumferentially dispersively at regular intervals, each servo region extending radially. Each servo region stores servo data. The servo data contains position information needed to position the head 12-i to a target range on a target track of the disk 11. The space between adjacent servo regions 110 on each recording surface of the disk 11 is assigned to a data region 111. Further, a number of concentric tracks (not shown) are arranged on each recording surface of the disk 11. A plurality of data sectors are assigned to each track of each data region 111.

A recording format called constant density recording (CDR) is employed for the disk 11. The recording surfaces of the disk 11, which employ the CDR format, are divided into a plurality of zones in the radial direction of the disk 11, and managed in units of zones. In the example of FIG. 2, assume that each recording surface of the disk 11 is divided into 10 zones Z0 to Z9 and managed in units of zones. The outer the zone, the greater the number of data sectors (hereinafter referred to simply as "sectors") included in the tracks (cylinders) of each zone Zj (j=0, 1, . . . , 9). This arrangement is made to effectively utilize the outer areas of the disk 11 that have tracks (cylinders) of longer circumferential lengths, thereby increasing the formatting efficiency of the disk 11. As is apparent, the outer the zone, the faster the data transfer speed at which data is read or written from or to the disk 11.

Figure 3:
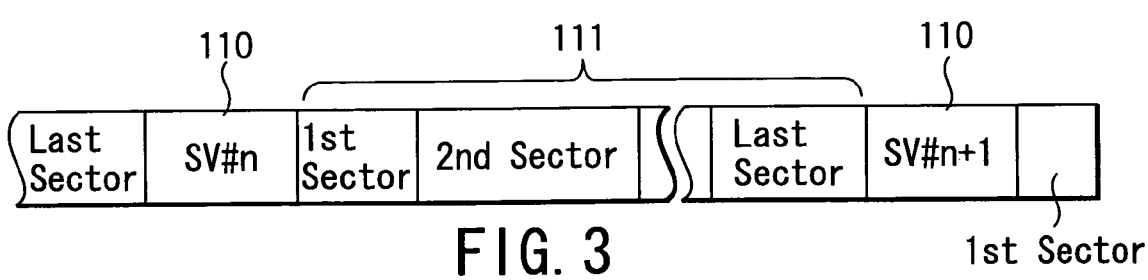
FIG. 3 is a view of the format of each track on the disk 11.

FIG. 3 shows the format of each track on the disk 11. The length of each data region 111 (in the circumferential direction of the disk 11) is not always an integral multiple of a sector length. Therefore, there is a case where a single sector is divided into two sectors with a servo region 110 interposed therebetween as shown in FIG. 3. These divided sectors are called split sectors. The data format for split sectors is the same as that for a normal sector except that these data formats have different user data sizes. The first sector, the last sector and the other sectors (the normal sectors other than the first and last sectors) in each data region 111 do not always have the same length.

Figure 4:
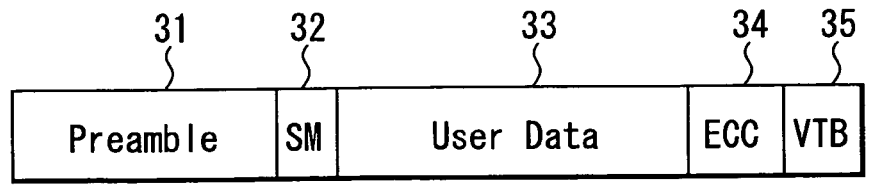
FIG. 4 shows the format of sector data recorded on the disk 11.

FIG. 4 shows the format of sector data recorded on the disk 11. As shown in FIG. 4, sector data comprises a preamble 31, sync mark (SM) 32, user data 33, ECC 34 and Viterbi control data (VTB) 35. The preamble 31 is data (preamble data) having a synchronization pattern of a predetermined frequency. The preamble 31 is used as a synchronization signal for read synchronizer 217 (see FIG. 5). The sync mark 32 is a specific code for detecting the leading bit of the following user data 33 during reading. The user data 33 is encoded data. The size of the user data 33 is, for example, 512 B (bytes) if the sector is not formed of split sectors. If the last sector and first sector adjacent to each other with the servo region 110 interposed therebetween are each formed of split sectors, the sum of the user data 33 of the last sector and first sector is 512 B. The ECC 34 is an error correcting code used to correct an error in reproduced user data 33. The Viterbi control data (VTB) 35 is data to be added to finish maximum likelihood (ML) determination performed to decode the user data 33 by partial response maximum likelihood (PRML) processing.

Referring again to FIG. 1, the disk 11 is spun at high speed by a spindle motor (hereinafter referred to as an "SPM") 13. Each head 12-i is attached to an actuator (carriage) 14. In accordance with the swing of the actuator 14, the head 12-i is radially moved over the disk 11, and positioned on a target track on the disk. The actuator 14 has a voice coil motor (hereinafter referred to as a "VCM") 15 as a driving source. The actuator 14 is driven by the VCM 15. The SPM 13 and VCM 15 are powered by respective driving currents (SPM current and VCM current) supplied from a driver integrated circuit (IC) 16. The driver IC 16 comprises an SPM driver 161 and VCM driver 162. The SPM driver 161 supplies the SPM 13 with the current designated by a CPU 40. The VCM driver 162 supplies the VCM 15 with the current designated by the CPU 40.

The head 12-i is connected to a head IC (head amplifier circuit) 17. The head IC 17 comprises a preamplifier (read amplifier) 171 and write driver (write amplifier) 172 (see FIG. 5). The head IC 17 is connected to the read/write IC (read/write channel) 20. The read/write IC 20 is a signal processing device for performing various types of signal processing, such as analog-to-digital conversion of a read signal, encoding of write data, and decoding of a digitized read signal. The read/write IC 20 is connected to a control unit 30. The control unit 30 comprises the above-mentioned CPU 40 and hard disk controller (hereinafter referred to as an "HDC") 50. The CPU 40 has a flash ROM (hereinafter referred to as an "FROM") 41 that stores a control program. The FROM 41 is a rewritable nonvolatile memory. Part of the memory area of the FROM 41 is used to store a format table 410, described later. The CPU 40 also has a RAM 42. Part of the memory area of the RAM 42 is used as a work area for the CPU 40. The CPU 40 executes the control program stored in the FROM 41 to control each element (such as the driver IC 16, head IC 17, read/write IC 20 and HDC 50) in the HDD. When head gap length search (hereinafter referred to as "HG length search") is designated, the CPU 40 sets the HDD in an HG length search mode. The HG length search mode is designated by a particular command (hereinafter referred to as an "HG length search command") from a host 60. In the HG length search mode, the head gap length (hereinafter referred to as an "HG length") of each head 12-i is detected (measured). The host 60 is a digital device, such as a personal computer, which utilizes the HDD. The HDC 50 has a sequencer 51. The sequencer 51 controls the input of a command by the host 60 and the transfer of data from and to the host 60. The sequencer 51 further controls the transfer of data from and to the disk 11 via the read/write IC 20. The sequencer 51 is characterized by a function for detecting the HG length of each head 12-i in the HG length search mode.

Figure 5:
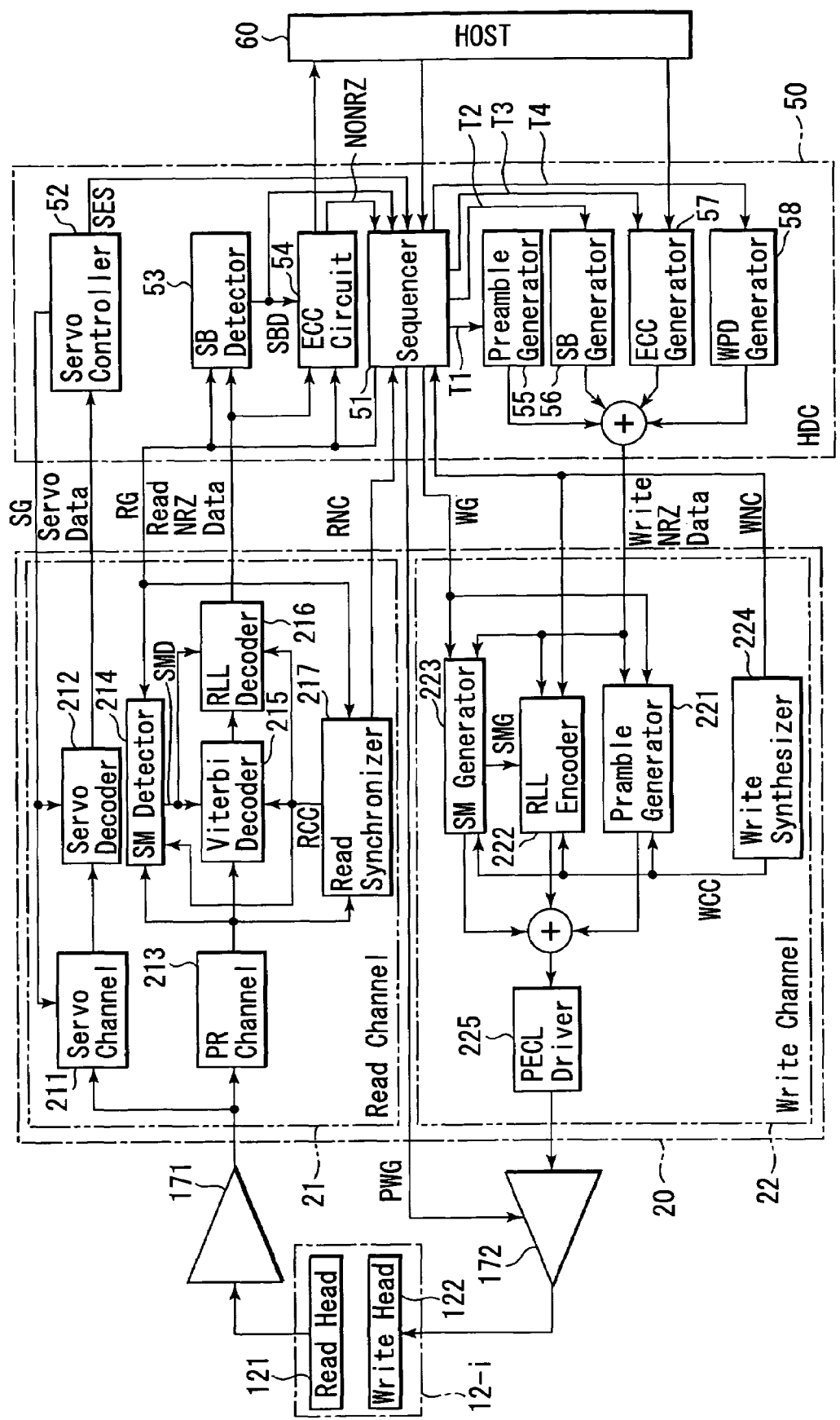
FIG. 5 is a block diagram mainly illustrating the read/write IC 20 and HDC 50 appearing in FIG. 1.

FIG. 5 mainly shows the configurations of the read/write IC 20 and HDC 50. As seen from FIG. 5, the read/write IC 20 has a read channel (read circuit) 21 and write channel (write circuit) 22. The read channel 21 has a known circuit for data reproduction. More specifically, the read channel 21 comprises a servo channel 211, servo decoder 212, partial response channel (hereinafter referred to as a "PR channel") 213, sync mark detector (hereinafter referred to as an "SM detector") 214, Viterbi detector (decoder) 215, run length limited decoder (hereinafter referred to as an "RLL decoder") 216 and read synchronizer 217. On the other hand, the write channel 22 has a known circuit for data recording. More specifically, the write channel 22 comprises a preamble generator 221, run length limited encoder (hereinafter referred to as an "RLL encoder") 222, sync mark generator (hereinafter referred to as an "SM generator") 223, write synthesizer 224, and pseudo emitter coupled logic driver (hereinafter referred to as a "PECL driver") 225. In addition to the sequencer 51 shown in FIG. 1, the HDC 50 comprises a servo controller 52, sync byte detector (hereinafter referred to as an "SB detector") 53, and error correction circuit (hereinafter referred to as an "ECC circuit") 54. The HDC 50 further comprises a preamble generator 55, sync byte generator (hereinafter referred to as an "SB generator") 56, ECC generator 57 and write pad generator (hereinafter referred to as an "WPD generator") 58.

Figure 6:
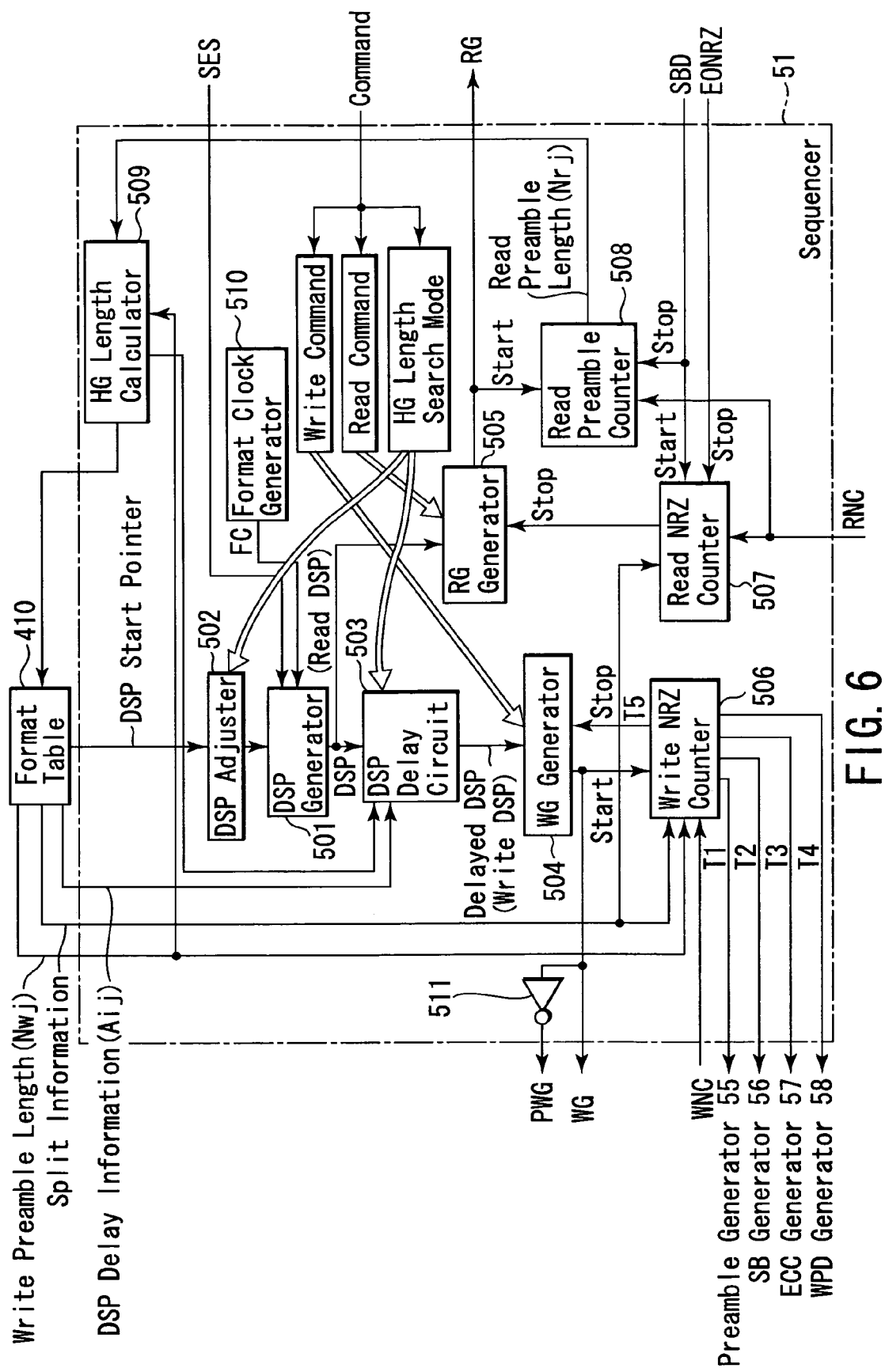
FIG. 6 is a view illustrating the configuration of the sequencer 51 appearing in FIG. 1.

FIG. 6 shows the configuration of the sequencer 51. As shown, the sequencer 51 comprises a data sector pulse generator (hereinafter referred to as a "DSP generator") 501, data sector pulse adjuster (hereinafter referred to as a "DSP adjuster") 502, data sector pulse delay circuit (hereinafter referred to as a "DSP delay circuit") 503, and write gate generator (hereinafter referred to as a "WG generator") 504. The sequencer 51 further comprises a read gate generator (hereinafter referred to as a "RG generator") 505, write NRZ (non-return to zero) counter 506, read NRZ counter 507, read preamble counter 508, HG length (head gap length) calculator 509 and format clock generator 510.

The DSP generator 501 generates, each time a servo edge signal SES is asserted, a data sector pulse DSP in synchrony with a clock signal (format clock signal) FC from the format clock generator 510. The servo edge signal SES is a timing signal indicating the terminal of each servo region 110 (i.e., the terminal of servo data), and is generated by the servo controller 52 in FIG. 5. The data sector pulses DSP correspond to the respective sectors (data sectors) in the data region 111 located just after each servo region 110. The output timing of the data sector pulse DSP is indicated by a DSP start pointer set on a basis of the format table 410. The contents of the format table 410 will be described later. The DSP adjuster 502 adjusts the timing of generation of the DSP when the HDD in FIG. 1 is in the HG length search mode.

The DSP delay circuit 503 delays the data sector pulse DSP, generated by the DSP generator 501, by a period DSPD in accordance with the format table 410. The data sector pulse DSP delayed by the period DSPD is used by the WG generator 504 as a timing signal for turning on the write gate (write gate signal) WG. In other words, the data sector pulse DSP delayed by the period DSPD is used as a data sector pulse DSP for writing (write DSP). The WG generator 504 turns on the write gate WG in accordance with the DSP (write DSP) delayed by the DSP delay circuit 503. The RG generator 505 turns on the read gate (read gate signal) RG, using the data sector pulse DSP, generated by the DSP generator 501, as a data sector pulse DSP for reading (read DSP).

The write NRZ counter 506 counts the number of clock pulses contained in a write NRZ clock signal WNC for writing NRZ data. The write NRZ clock signal WNC is output from a write synthesizer 224 incorporated in the read/write IC 20. The write gate WG turned on by the WG generator 504 is used as a start signal for causing the write NRZ counter 506 to start counting. The write NRZ counter 506 sequentially counts a number N1 of clock pulses, a number N2 of clock pulses, a number N3 of clock pulses and a number N4 of clock pulses (i.e., sequentially measures periods N1 to N4). N1 represents the number of clock pulses corresponding to the preamble, and N2 the number of clock pulses corresponding to a sync byte (SB). Further, N3 represents the number of clock pulses corresponding to the total length of the user data, ECC and Viterbi control data (VTB), and N4 the number of clock pulses corresponding to the length of the write pad (WPD). The write NRZ counter 506 outputs timing signals T1 to T4 while the numbers N1 to N4 of clock pulses are counted, respectively. The timing signals T1, T2, T3 and T4 are used to activate the preamble generator 54, SB generator 55, ECC generator 56 and WPD generator 57, respectively. The information needed for the counting of the write NRZ counter 506 is acquired from the format table 410.

The read NRZ counter 507 counts the number of clock pulses contained in a read NRZ clock signal RNC for reading NRZ data. The read NRZ clock signal RNC is output from a read synchronizer 217 incorporated in the read/write IC 20. An SB detection signal SBD output from the SB detector 53 in the HDC 50 is used as a start signal for causing the read NRZ counter 507 to start counting. On the other hand, a signal EONRZ that is output from the ECC circuit 54 of the HDC 50 and indicates the timing of the end of NRZ data is used as a stop signal for causing the read NRZ counter 507 to stop counting.

The read preamble counter 508 counts the number of clock pulses contained in the read NRZ clock signal RNC. The read gate RG turned on by the RG generator 505 is used as a start signal for causing the read preamble counter 508 to start counting. On the other hand, an SB detection signal SBD output from the SB detector 53 of the HDC 50 is used as a stop signal for causing the read preamble counter 508 to stop counting. Thus; the read preamble counter 508 measures the length of preamble data (read preamble length) transferred from the read channel 21 to the HDC 50. The HG length calculator 509 calculates the HG length from the write preamble length shown in the format table 410, the read preamble length measured by the read preamble counter 508, WPL and RPL described later. The format table 410 is updated based on the HG length calculated by the HG length calculator 509.

Figure 8:
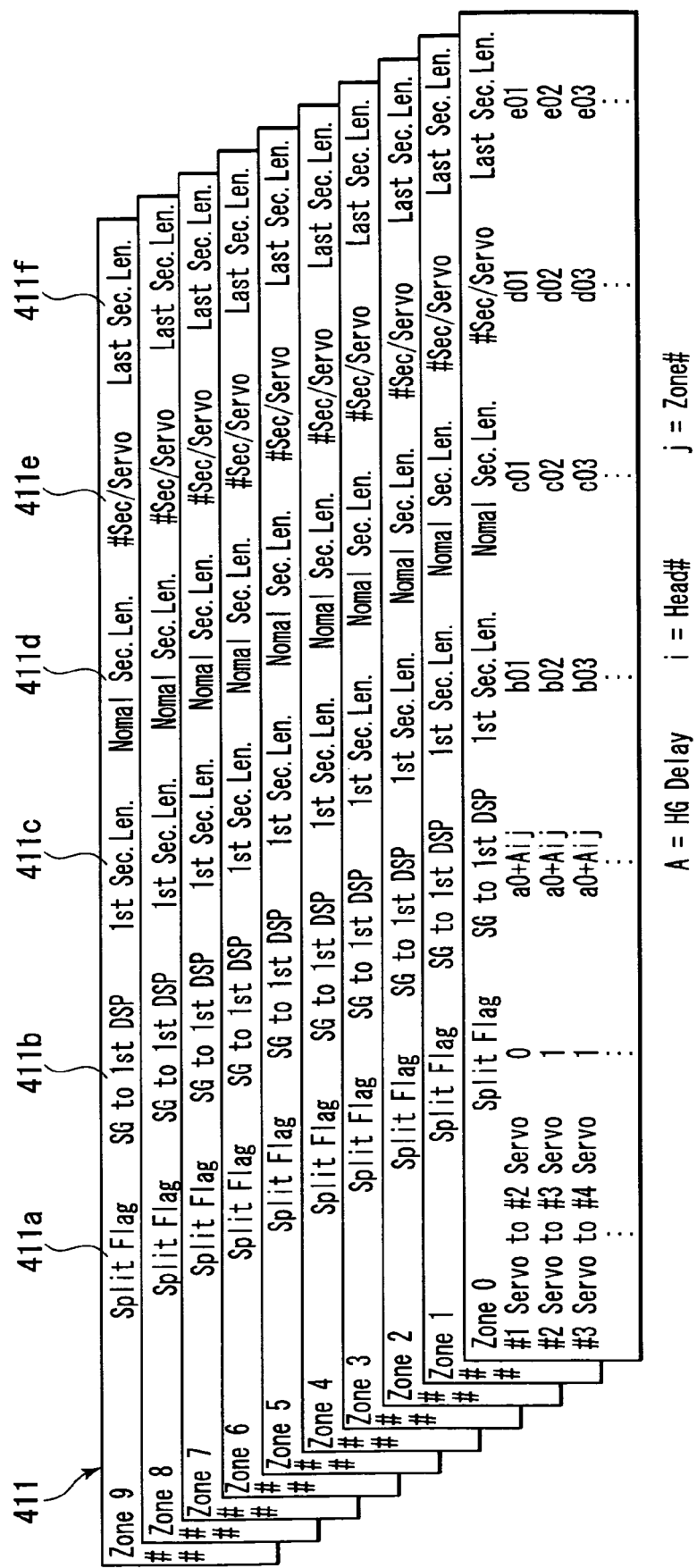
FIG. 8 is a view illustrating, in detail, the data configuration example of a DSP table 411 included in the format table 410.

FIG. 7 shows a data configuration example employed in the format table 410. The format table 410 comprises a DSP table 411 and zone parameter table 412. The DSP table 411 prestores information indicating the arrangement of DSPs, i.e., sector format assignment information, in units of zones Zj (j=0, 1, . . . , 9) and in units of pairs of adjacent servo regions 110 (data regions 111). The entry of the DSP table 411 that stores sector format assignment information (hereinafter referred to as "split information") includes fields 411a to 411f. The field 411a stores a split flag that indicates whether there is a split sector. The field 411b stores information indicating the interval (SG to 1st DSP) between the end of the servo gate SG to the first DSP. The field 411c stores information indicating the length of the first sector (first sector length). The field 411d stores information indicating the length (normal sector length) of the sectors (normal sectors) other than the first and last sectors. The field 411e stores information indicating the number of DSPs to be generated between adjacent servo regions 110 (i.e., each data region 111), i.e., the number of sectors included in each data region 111. The field 411f stores information indicating the length of the last sector (last sector length). FIG. 8 shows, in detail, a data configuration example employed in the DSP table 411. The data configuration itself of the DSP table 411 is a known technique. The present embodiment is partly characterized in that the period obtained by adding a head gap delay Aij (i represents the head H0 or H1, and j represents one of zones Z0 to Z9) to a period (SG to 1st DSP) aj is actually used as the period from the end of the servo gate SG to the first DSP. The period aj is indicated by the information stored in the field 411b of the DSP table 411. The head gap delay (hereinafter referred to as an HG delay) Aij is indicated by the DSP delay information (HG delay information, HG length information) stored in the zone parameter table 412 as described later. In the following description, Aij may be used as a parameter indicating the data length corresponding to the period.

As shown in FIG. 7, the zone parameter table 412 has entries for respective zones Zj. Each entry of the table 412 includes fields 422a to 422d. The fields 422a and 422b store a parameter indicating a write clock frequency, and a parameter indicating a write preamble data length (Nwj), respectively. The fields 422c and 422d store a parameter indicating the HG delay (A0j) determined from the HG (head gap) length of the head 12-0 (H0), and a parameter indicating the HG delay (A1j) determined from the HG (head gap) length of the head 12-1 (H1), respectively. The unique HG delay of each head Hi (i=0, 1) and zone Zj will be hereinafter referred to as an HG delay Aij. The value of the HG delay Aij depends not only upon the heads Hi but also upon the zones Zj. This is because the speed of data transfer varies between the zones Zj. In other words, the distance (HG length) between the read head 121 and write head 122 is constant, whereas the period or data length corresponding to the distance varies between the zones Zj. In the embodiment, the HG gap length basically represents a data length corresponding to the distance between the read head 121 and write head 122, but may represent the time corresponding to the data length. This embodiment is partly characterized in that each entry of the zone parameter table 412 is provided with the fields 422c and 422d that store the parameters, i.e., the HG delays A0j and A1j, respectively. The HG delay A0j and A1j stored in the fields 422c and 422d are optimized based on the HG lengths of the heads 12-0 (H0) and 12-1 (H1) detected in the HG length search mode, as will be described later. The field 422a stores two parameters Mj and Nj. In this case, the write clock frequency is expressed by (basic frequency)× Nj/Mj.

In the embodiment, minimum sector length information that does not consider the HG is used as the sector length information stored in the fields 411c, 411d and 411f of each entry of the DSP table 411. When the head Hi performs writing in the zone Zj, the HG delay Aij peculiar to the zone Zj and head Hi is added to the period aj, thereby delaying the 1st DSP. The period aj ranges from the end of the servo gate SG to the 1st DSP (SG to 1st DSP). The period aj is stored in the field 411b of the entry of the DSP table 411 that corresponds to the zone Zj. If the 1st DSP is delayed, the entire sector position of the data region 111 is shifted by the data length corresponding to Aij, since the length of the sectors other than the first sector is fixed. If Aij is correctly optimized, the end of the servo data stored in the servo region 110 is prevented from being destroyed by a write operation. Further, since the interval of DSPs does not include the period corresponding to the HG (head gap), the formatting efficiency is enhanced.

Figure 9:
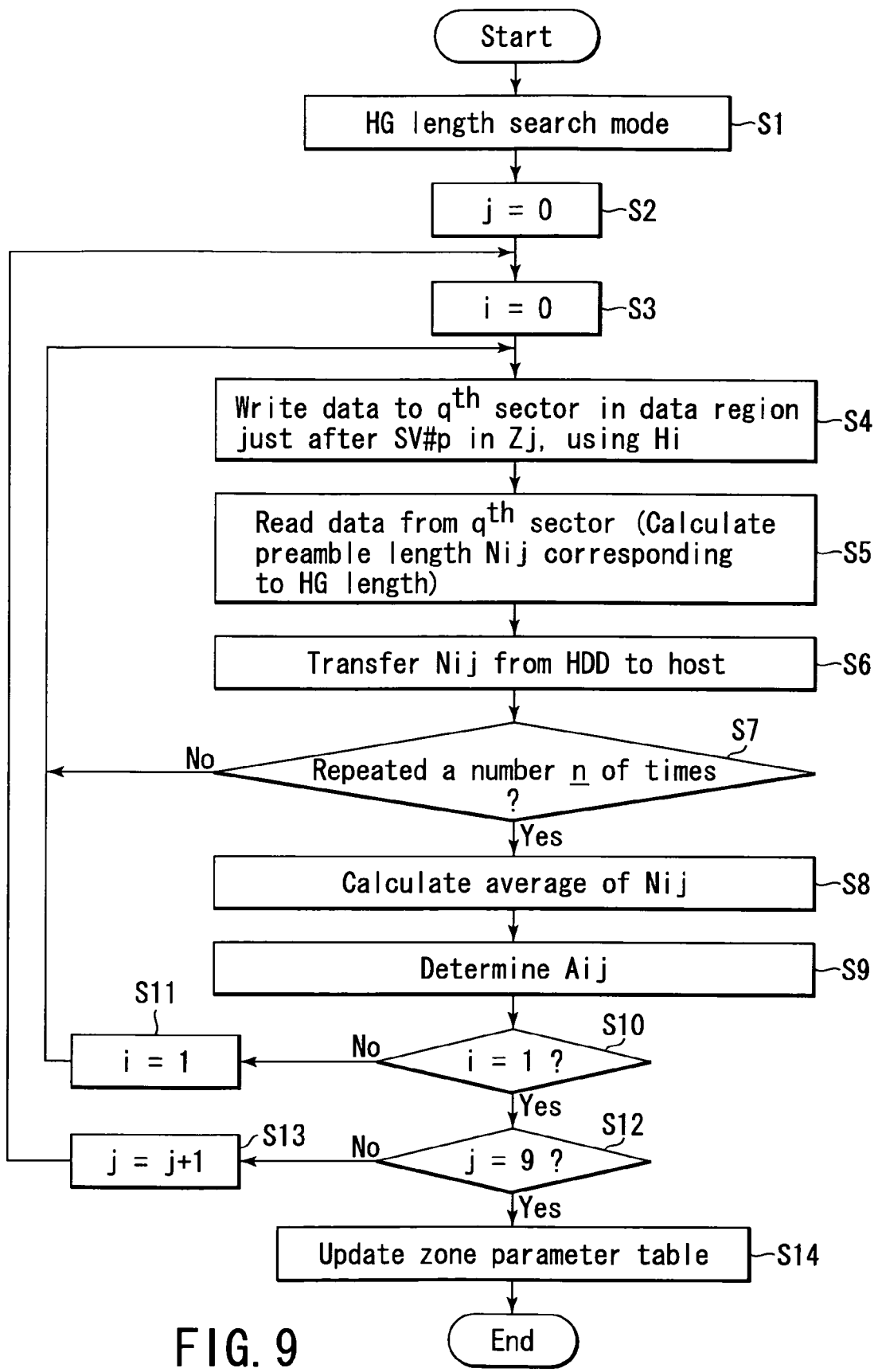
FIG. 9 is a flowchart useful in explaining the procedure of head gap length (HG length) detection.

Referring to the flowchart of FIG. 9 and the timing charts of FIGS. 10A to 10L, the operation of the embodiment will be described using, as an example, HG length detection in units of heads and zones in the HG length search mode. Firstly, the host 60 supplies the HDD of FIG. 1 with an HG length search command. Upon receiving the command via the HDC 50, the CPU 40 sets the HDD in the HG length search mode (step S1). In this state, the host 60 sets, to an initial value of 0, a variable j indicating the position of the zone Zj on the disk 11 (step S2), and sets, to an initial value of 0, a variable i indicating the head Hi (step S3). Thereafter, the host 60 supplies the HDD with a write command to write data (sector data) to a certain sector in the zone Zj, using the head Hi (step S4). This sector is the $q^{th}$ sector in a certain data region 111 in the zone Zj corresponding to the head Hi. Further, the data region 111 is located just after the $p^{th}$ servo region 110 (SV#p) in the zone Zj corresponding to the head Hi. In the embodiment, for facilitating the description, assume that the $q^{th}$ sector is the first sector (i.e., q=1). In HDDs, in accordance with a write command from the host 60, data is written to the $q^{th}$ sector in the following manner.

Firstly, assume that in accordance with the write command from the host 60, the head Hi (12-i) is positioned on a central track TRc included in the tracks of the zone Zj. In this state, the read head 121 included in the head Hi (12-i) converts, into an electrical signal, the data magnetically recorded on the track TRc. The electrical signal generated by the read head 121 (i.e., the read signal reproduced by the read head 121) is amplified by the preamplifier 171 of the head IC 17 and input to the read/write IC 20. The servo channel 211 of the read/write IC 20 converts the read signal, input to the read/write IC 20, into quantized read data. The servo decoder 212 detects (extracts) servo data from the read data quantized by the servo channel 211. The servo data detected by the servo decoder 212 is input to the servo controller 52 of the HDC 50. The servo controller 52 turns on the servo gate (servo gate signal) SG (see FIG. 10A) during the time corresponding to the servo region 110 (SV#p), in accordance with the output of the servo decoder 212. The servo controller 52 also detects the end of the servo region 110 (SV#p), and outputs a servo edge signal SES that is asserted at a time corresponding to the end position. At this time, the servo controller 52 turns off the servo gate SG. The servo edge signal SES is input to the sequencer 51 of the HDC 50. When the end of the servo region 110 (SV#p) is detected, the read head 121 included in the head Hi (12-i) is positioned at the end of the servo region 110 (SV#p). At this time, the write head 122 included in the head Hi (12-i) does not reach the end of the servo region 110 (SV#p), and is still within the region 110.

The servo edge signal SES input to the sequencer 51 is guided to the DSP generator 501 incorporated in the sequencer 51. When the servo edge signal SES output by the servo controller 52 is asserted, the DSP generator 501 is activated. When activated, the DSP generator 501 starts to count the number of clock pulses contained in the format clock signal FC output from the format clock generator 510 (i.e., starts time measurement). The frequency of the format clock signal FC is set sufficiently higher (for example, about twice) than that of the read NRZ clock signal RNC (see FIG. 10J) and that of the write NRZ clock signal WNC (see FIG. 10E). The clock signals RNC and WNC are output by the read synchronizer 217 of the read channel 21 and the write synthesizer 224 of the write channel 22, respectively.

In the normal mode, i.e., not in the HG length search mode, the DSP generator 501 outputs the first data sector pulse DSP (1st DSP) after the period aj has elapsed from the time when the servo edge signal SES is asserted. The period aj is stored in the field 411b of the entry of the DSP table 411 that corresponds to the zone Zj. When the period corresponding to the first sector length stored in the field 411c of the DSP table 411 has further elapsed from the output time of the 1st DSP, the DSP generator 501 outputs the second data sector pulse (2nd DSP). After that, until the leading edge of the next servo region 110 is detected, the DSP generator 501 outputs a DSP each time the period corresponding to a normal sector length is measured. The normal sector length is stored in the field 411d of the DSP table 411. The count number of the DSP generator 501, which indicates the output timing of DSPs, is pointed by the DSP start pointer. The DSP start pointer is updated based on the sector length stored in the field 411c or 411d in the DSP table 411.

When the HG length search mode is set as in the embodiment, the DSP start pointer is shifted by the DSP adjuster 502 by the period corresponding to an HG length HGmax. The HG length HGmax is the maximum HG length set in light of the common difference in head gap. If the DSP start pointer is shifted by the period corresponding to the HG length HGmax, the DSP generator 501 outputs the first DSP when the period corresponding to (aj+HGmax) has elapsed. In other words, the DSP generator 501 outputs the 1st DSP later than usual by the period HGmax. The output timing of DSPs after the 1st DSP is the same as that in the case where the DSP adjuster 502 does not perform adjustment. However, since the 1st DSP is delayed by the period corresponding to the HG length HGmax, the output timing of the 2nd et seq. DSPs is also delayed by the period corresponding to the HG length HGmax.

Each DSP output by the DSP generator 501 is input to the DSP delay circuit 503, where it is delayed by the period DSPD in the normal mode. The period DSPD is determined from the HG delay Aij indicated by the DSP delay information stored in the zone parameter table 412 of the format table 410. On the other hand, in the HG length search mode, the delay function of the DSP delay circuit 503 is inhibited. Accordingly, the DSP (e.g., the 1st DSP) already delayed by the period corresponding to the HG length HGmax is output by the DSP delay circuit 503 without being further delayed. This case is equivalent to DSPD=0.

The DSP output by the DSP delay circuit 503 is input as a write DSP (see FIG. 10B) to the WG generator 504. The WG generator 504 operates during data writing (during execution of a write command), and turns on the write gate WG (see FIG. 10C) in synchrony with, for example, the trailing edge of a write DSP input thereto. When the write gate WG is turned on, an inverter 511 turns off a preamp write gate (preamp write gate signal) PWG (see FIG. 10D). The preamp write gate PWG is used to control the operation of the write driver 172. The write driver 172 operate when the preamp write gate PWG is in the OFF state.

When the write gate WG is turned on, the write NRZ counter 506 is activated, thereby starting to count the number of clock pulses contained in the write NRZ clock signal WNC output by the write synthesizer 224. The write NRZ counter 506 sequentially counts numbers N1 to N4 of clock pulses, based on the write preamble length Nwj peculiar to the zone Zj, zone Zj, head Hi, and split information peculiar to the adjacent $p^{th}$ servo region 110 and $(p+1)^{th}$ servo region 110 (SV#p and (SV#p+1)). While counting the numbers N1 to N4, the write NRZ counter 506 generates the timing signals T1 to T4. The write preamble length Nwj is stored in the zone parameter table 412 included in the format table 410. The split information is stored in the DSP table 411 included in the format table 410. The timing signal T1 is used to designate, for the preamble generator 55, the timing of generation of preamble data with a length of Nwj (bytes). The timing signal T2 is used to designate, for the SB generator 56, the timing of generation of the sync byte (SB). The timing signal T3 is used to designate, for the ECC generator 57, the timing of generation of the user data, ECC and VTB. The timing signal T4 is used to designate, for the WPD generator 58, the timing of generation of the write pad data (WPD).

The preamble generator 55 generates to-be-written preamble data (write preamble) with a length of Nwj (bytes) in synchrony with the timing signal T1 output by the write NRZ counter 506 of the sequencer 51. The SB generator 56 generates a sync byte (SB) after the preamble data, in synchrony with the timing signal T2 from the sequencer 51. The ECC generator 57 outputs user data (write data) designated by a command from the host 60, in synchrony with the timing signal T3 from the sequencer 51. Further, the ECC generator 57 creates an ECC based on the user data, and outputs it after the user data. The ECC generator 57 also creates Viterbi control data (VTB) and outputs it after the ECC. The WPD generator 58 generates write pad data (WPD) in synchrony with the timing signal T4 from the sequencer 51. The length of the write pad data (WPD) corresponds to the delay time (write path delay time) of processing in the write channel 21 (write path) in the read/write IC 20. The preamble data, sync byte (SB), user data, ECC, Viterbi control data (VTB) and write pad data (WPD) are transferred to the write channel 22 of the read/write IC 20 in the order mentioned above. The series of data transferred to the write channel 22 is, for example, NRZ data (write NRZ data). The NRZ counter 506 of the sequencer 51 outputs a timing signal T5 to the WG generator 504 at a time corresponding to the end of the series of write NRZ data, i.e., the end of write pad data (WPD). The WG generator 504 turns off the write gate WG in synchrony with the timing signal T5 from the write NRZ counter 506. Thus, the timing signal T5 is used to stop the generation of the write gate WG by the WG generator 504.

When data designated by a write command from the host 60 is written, the write synthesizer 224 of the write channel 22 generates two write clock signals of a frequency peculiar to the zone Zj designated by the write command. In this embodiment, the write synthesizer 224 generates the write NRZ clock signal WNC (see FIG. 10E) used by the HDC 50, and a write channel clock signal WCC used by the write channel 22. The preamble generator 221 and SM generator 223 are activated in accordance with the write gate WG output from the WG generator 504 of the sequencer 51 in the HDC 50. The preamble generator 221 outputs preamble data to be recorded on the disk 11, in synchrony with the write channel clock signal WCC on the basis of the preamble data contained in write NRZ data (see FIG. 10F) transferred from the HDC 50. The data length of the preamble data (write preamble) in the write NRZ data is Nwj. On the other hand, the data length of preamble data (written preamble) output from the preamble generator 221 is (Nwj+WPL). WPL (write path latency) indicates the bytes corresponding to the delay time of signal processing (in particular, encoding by the RLL encoder 222) in the write channel 22 (write path), i.e., WPL indicates delay bytes.

The SM generator 223 performs pattern matching of write NRZ data, transferred from the HDC 50, and a predetermined sync byte (SB) in synchrony with the write channel clock WCC. As a result, the SM generator 223 detects a sync byte (SB) in the write NRZ data. At this time, the SM generator 223 generates a sync mark (SM) and a sync mark generation signal SMG indicating the generation of the sync mark. The sync mark generation signal SMG is a timing signal indicating the leading edge of user data subsequent to the detected sync byte (SB). The RLL encoder 222 is activated in accordance with the sync mark generation signal SMG from the SM generator 223. Upon activation, the RLL encoder 222 receives data subsequent to the sync byte (SB) contained in write NRZ data transferred from the HDC 50, and converts (modulates) the input data into an RLL (run length limited) code as a channel recording code. This processing is continued until the write gate WG is turned off. The write gate WG is turned off when the end of write pad data (WPD) of a data length corresponding to the write path delay time is reached. As a result, the RLL encoder 222 modulates, into RLL codes, the user data, ECC and Viterbi control data (VTB) subsequent to the sync byte (SB).

The preamble data (written preamble) generated by the preamble generator 221, the sync mark (SM) generated by the SM generator 223, and the data modulated by the RLL encoder into RLL codes (the user data, ECC and Viterbi control data) are transferred, in this order, as write head data (see FIG. 10G) to the write driver 172 of the head IC 17 via the PECL driver 225. The write driver 172 converts, into a write current, the write head data (sector data) transferred via the PECL driver 225, and supplies it to the write head 122 of the head 12-i (Hi). The write head 122 of the head 12-i writes sector data to the $q^{th}$ sector (in this case, the first sector) in the data region 111 located just after the $p^{th}$ servo region 110 (SV#p) on a track TRc contained in the zone Zj of the disk 11. The sector data written to the $q^{th}$ sector on the disk 11 comprises the preamble 31, sync mark (SM) 32, user data 33, ECC 34 and Viterbi control data (VTB) 35. The data region 111 located just after the $p^{th}$ servo region 110 (SV#p) indicates the region 111 between the $p^{th}$ servo region 110 (SV#p) and $(p+1)^{th}$ servo region 110 (SV#p+1).

As described above, in the embodiment, when the HG length search mode is set, if there is an instruction to write data to the $q^{th}$ sector, the 1st DSP (write DSP) is output after the period corresponding to (aj+HGmax) has elapsed from the time when the servo gate SG was turned off (i.e., from the time corresponding to the end of SV#p). The time of turn-off of the servo gate SG corresponds to the end of the servo region 110 (SV#p) located just before the data region 111 that contains the target $q^{th}$ sector. In the embodiment, to-be-written data (write NRZ data) is transferred from the HDC 50 to the write channel 22 of the read/write IC 20 in synchrony with the output timing of a DSP. The data transferred to the write channel 22 is output to the write head 122 of the head 12-i via the head IC 17. The leading preamble data of the data (write head data) output to the write head 122 is held in the write channel 22 by a delay time corresponding to delay in the write path of the write channel 22. Accordingly, the data length of the preamble data output from the write channel 22 to the write head 122 is longer than the data length Nwj of the original preamble data by a data length (bytes) WPL corresponding to the delay time. As a result, the preamble data (written preamble) output to the write head 122 is written, as a preamble (preamble data) 31 with a data length of (Nwj+WPL), to a target sector (in this case, the $q^{th}$ sector in the data region 111 just after the servo region SV#p).

Thus, data is written to the $q^{th}$ sector in accordance with the write command from the host 60. After completing the writing of data to the $q^{th}$ sector, the host 60 supplies the HDD with a read command to read data from the $q^{th}$ sector (=the first sector), with the HG length search mode kept (step S5). As a result, in the HDD, data is read from the $q^{th}$ sector in the following manner. Firstly, the read signal reproduced by the read head 121 of the head Hi (12-i) is amplified by the preamplifier 171 of the head IC 17. The amplified read signal is guided to the servo channel 211 and PR channel 213 of the read channel 121 incorporated in the read/write IC 20.

The PR channel 213 has known peripheral elements, such as a variable gain amplifier (VGA), continuous time filter (CTF), analog-to-digital converter and finite impulse response (FIR) filter, which are not shown. The VGA forms an automatic gain control (AGC) circuit. The CTF forms a low pass filter (LPF). The read signal input to the PR channel 213 is adjusted by the VGA to have a uniform amplitude, and is subjected by the CTF to noise removal and equalization for expected response. The data output from the CTF is quantized by the analog-to-digital converter, and equalized by the FIR filter in accordance with the partial response (PR) class. The output data of the PR channel 213 is input to the SM detector 214, Viterbi detector 215 and read synchronizer 217.

In the sequencer 51 of the HDC 50, the DSP generator 501 outputs data sector pulse DSP (1st DSP) in the same manner as the writing of data to the $q^{th}$ sector in the HG length search mode. The data sector pulse DSP (1st DSP) is delayed by the DSP adjuster 502 from the time corresponding to the end of the servo region 110 (SV#p) (i.e., from the output time of the servo edge signal SES) by the period corresponding to (aj+HGmax). The DSP output from the DSP generator 501 is input as a read DSP (see FIG. 10H) to the RG generator 505. The RG generator 505 operates during data reading, and turns on the read gate RG (see FIG. 10I) in synchrony with the trailing edge of the input read DSP.

Upon turn-on of the read gate RG, the read synthesizer 217 is activated. The read synthesizer 217 contains a phase-locked loop (PLL) circuit (not shown). Upon activation, the read synthesizer 217 starts phase acquisition in accordance with the preamble data in the output data of the PR channel 213. The read synthesizer 217 reproduces the read NRZ clock signal RNC (see FIG. 10J) formed of a read NRZ clock pulse string, and a read channel clock signal RCC formed of a read channel clock pulse string. The read NRZ clock signal RNC is input to the sequencer 51 of the HDC 50, while the read channel clock signal RCC is input to the SM detector 214, Viterbi detector 215 and RLL decoder 216 of the read channel 21.

Upon turn-on of the read gate RG, the SM detector 214 is activated. The SM detector 214 performs pattern matching of the output data of the PR channel 213 and the bit pattern of a predetermined sync mark (SM) in synchrony with the read channel clock signal RCC. As a result, the SM detector 214 detects a sync mark (SM) in the output data of the PR channel 213. Upon detecting the sync mark (SM), the SM detector 214 determines that the bit subsequent to the last bit of the sync mark (SM) is the first bit of user data. In synchrony with the bit subsequent to the last bit of the sync mark (SM), the SM detector 214 outputs a sync mark detection signal SMD. The sync mark detection signal SMD is input to the Viterbi detector 215 and RLL decoder 216. The signal SMD is used as a timing signal indicating the start position of user data subsequent to the sync mark (SM).

The Viterbi detector 215 is activated in accordance with the sync mark detection signal SMD from the SM detector 214. The Viterbi detector 215 has a partial response maximum likelihood (PRML) circuit (not shown). The Viterbi detector 215 processes the data equalized by the FIR filter of the PR channel 213, using the PRML circuit and Viterbi algorithm, thereby generating RLL data (RLL codes). In other words, the Viterbi detector 215 processes the data, equalized by the FIR filter of the PR channel 213, in units of bits in synchrony with the read channel clock signal RCC, thereby generating candidate data sequences (transient paths) formed of possible bit combinations. The Viterbi detector 215 selects maximum likelihood candidate data sequence from the generated candidate data sequences, and outputs it as decoded RLL data. The decoded RLL data includes user data and an ECC.

The RLL data output from the Viterbi detector 215 is converted into NRZ data by a post coder (not shown), and input to the RLL decoder 216. The RLL decoder 216 converts (demodulates) the input RLL data into original code data in synchrony with the read channel clock signal RCC. After decoding the input RLL data into original code data, the RLL decoder 216 adds a sync byte (SB) of a particular pattern to the leading portion of the code data, and outputs the resultant data. The particular pattern is, for example, FFh (h indicates that the value with h is based on the hexadecimal number system). The data with the sync byte (SB) output from the RLL decoder 216 is transferred to the SB detector 53 and ECC circuit 54 of the HDC 50. The data with the sync byte (SB) is NRZ data (read NRZ data) that contains user data and an ECC. Data of, for example, 00h is input as preamble data to the SB detector 53 and ECC circuit 54 during a period ranging from a time point t1 at which the read gate RG is turned on, to a time point t2 at which the sync byte (SB) is transferred from the RLL decoder 216 to the SB detector 53 and ECC circuit 54.

Upon turn-on of the read gate RG, the SB detector 53 and ECC circuit 54 are activated. The SB detector 53 detects the sync byte (SB) contained in the read NRZ data (see FIG. 10L) transferred from the RLL decoder 216. Upon detecting the sync byte (SB), the SB detector 53 outputs an SB detection signal SBD. The SB detection signal SBD is guided to the ECC circuit 54, and the read NRZ counter 507 and read preamble counter 508 incorporated in the sequencer 51. The ECC circuit 54 corrects an error in the user data of the NRZ data transferred from the RLL decoder 216, based on an ECC attached to the user data. The user data corrected by the ECC circuit 54 is transferred, to the host 60, as user data (read data) read from the $q^{th}$ sector designated by the host 60.

Upon turn-on of the read gate RG, the read preamble counter 508 of the sequencer 51 is activated. The activated preamble counter 508 counts the number of clock pulses contained in the read NRZ clock signal RNC output from the read synthesizer 217 of the read channel 21. The preamble counter 508 continues counting until the SB detector 53 outputs an SB detection signal SBD. As mentioned above, in the HG length search mode, the read gate RG and write gate WG are turned on at the same time (in the embodiment, at the time point t1). At the time point t1, the write head 122 is positioned closer to the end of the servo region 110 (SV#p) by the HG length than the read head 121. In other words, the time point t1 is later, by the period corresponding to the HG length, than the time point t3 corresponding to the leading edge of preamble data (data length=Nwj+WPL) written to the $q^{th}$ sector (=the first sector) on the disk 11 (see FIGS. 10H to 10L). This means that the preamble data, read while the read gate RG is ON, does not contain the data portion (leading data portion) of the preamble data actually written on the disk 11, the data length (bytes) Nij of the data portion corresponding to the HG length. On the other hand, a time point t2 at which the SB detection signal SBD is output from the SB detector 53 of the HDC 50 is later than a time point t4 at which the SM detector 214 of the read channel 21 has detected a sync mark (SM), by the period (read path delay time) corresponding to the delay time of signal processing in the read channel 21 (read path). At the time point t2, a sync byte (SB) is also transferred from the read channel 21 to the HDC 50. At the time point t4, a sync mark detection signal SMD is also output from the SM detector 214. The delay time of signal processing in the read channel 21 includes the delay time of processing in the Viterbi detector 215 and RLL decoder 216. RPL (read path latency) indicates the bytes (delay bytes) corresponding to the delay time of signal processing in the read channel 21.

As described above, the preamble data (read preamble data) read during the period from the time point t1 to the time point t2 does not contain the data portion (leading data portion) of the preamble 31 recorded on the $q^{th}$ sector designated by the host 60, the data portion having bytes Nij corresponding to the HG length. The data length Nrj of the read preamble data is given by $$Nrj = Nwj + WPL + RPL - Nij \quad (1)$$

That is, the data length Nrj of the read preamble data read during the period from t1 to t2 is obtained by adding bytes RPL, corresponding to the read path delay, to the data length (Nwj+WPL) of the preamble 31 recorded on the $q^{th}$ sector, and then subtracting therefrom the bytes Nij corresponding to the HG length. Accordingly, the bytes Nij corresponding to the HG length is given by $$Nij=Nwj+WPL-(Nrj-RPL) \quad (2)$$

In the above, Nwj, WPL, RPL are known values. Therefore, if Nrj is acquired, the HG length Nij (the bytes Nij corresponding to the HG length) is calculated.

As described above, the read preamble counter 508 counts the number of clock pulses contained in the read NRZ clock signal RNC during the period from t1 to t2. As is also apparent from FIGS. 10A to 10L, the count value of the read preamble counter 508 at t2 (i.e., the count value corresponding to the period from t1 to t2) indicates the read preamble data length Nrj. Accordingly, from the equation (2) and the count value of the read preamble counter 508 at t2, the HG length Nij can be obtained. The calculation using the equation (2) is performed by the HG length calculator 509 of the sequencer 51.

As described above, in the embodiment, in the HG length search mode, data is written to the $q^{th}$ sector (step S4), and then read therefrom, thereby acquiring the HG length Nij (step S5). The host 60 reads the HG length Nij via, for example, a register (not shown) in the HDC 50 (step S6). The host 60 repeats the steps S4 to S6 a number n of times (step S7). As a result, a number n of Nij are obtained. The host 60 calculates the average of the number n of Nij (step S8), and determines that the period corresponding to the average is the HG delay Aij peculiar to the zone Zi and head 12-i (Hi) (step S9).

The host 60 executes the steps S4 to S9 for any combination of all heads 12-i (Hi) and all zones Zj (any combination of the heads 12-0 (H0) and 12-1 (H1) and zones Z0 to Z9) (steps S10 to S13). After that, the host 60 updates, to the determined Aij (i=0, 1; j=0, 1, . . . , 9), the HG delay Aij already stored in units of zones and heads in the zone parameter table 412 (step S14). Alternatively, each time Aij is determined at the step S9, the corresponding HG delay Aij already stored in the zone parameter table 412 may be updated to the determined Aij.

In the embodiment, to facilitate the description, the target sector, to which data is written in the HG length search mode, is set to the first sector (q=1) in the data region 111 just after the $p^{th}$ servo region 110 (SV#p). However, it is preferable to use, as the target sector, a sector other than the first sector, for the following reason: In the HG length search mode, the output timing of a DSP (the 1st DSP) is delayed by the DSP adjuster 502 by the period corresponding to (aj+HGmax). Accordingly, there is a very slim possibility of data being written to the end of the $p^{th}$ servo region 110 (SV#p). However, if the actual HG length is longer than the estimated HGmax, data may be written to the end of the $p^{th}$ servo region 110 (SV#p), and part of the servo data stored in the $p^{th}$ servo region 110 may be destroyed. In light of this, it is advisable to use, as the target sector for data writing in the HG length search mode, a sector other than the first sector, e.g., the second sector (in the data region 111). Further, in the embodiment, the process as illustrated in the flowchart of FIG. 9 is performed under the control of the host 60. However, control may be modified so that the host 60 performs only the process (step S1) of setting the HDD of FIG. 1 in the HG length search mode, and the processes after the step S1 are automatically performed under the control of the CPU 40 in the HDD. Furthermore, in the case of an HDD that does not employ the CDR format as the disk format, HG length detection may be performed in units of heads.

Referring to the timing charts of FIGS. 11A to 11J, normal data writing and reading performed after the zone parameter table 412 is updated will be described. Assume here that a target sector for data reading in the zone Zj by the head Hi is the first sector in the data region 111 just after the $p^{th}$ servo region 110 (SV#p). In this case, the DSP generator 501 outputs the 1st DSP after the period aj has elapsed from the time corresponding to the end of the $p^{th}$ servo region 110 (SV#p). The DSP delay circuit 503 delays the 1st DSP, output from the DSP generator 501, by a period DSPD determined by the HG delay Aij shown in the format table 410. The DSP (1st DSP) delayed by the DSP delay circuit 503 is used as a write DSP (see FIG. 11B).

Based on the write DSP (1st DSP), the WG generator 504 turns on a write gate WG (see FIG. 11C) indicating the timing of writing data to a sector (first sector). Upon turn-on of the write gate WG, data (write NRZ data) is transferred from the HDC 50 to the write channel 22 of the read/write IC 20, in the order of preamble data (write preamble), a sync byte (SB), user data, an ECC, Viterbi control data (VTB) and write pad data (WPD), as is shown in FIG. 11E. The data length (bytes) of the preamble data transferred from the HDC 50 to the write channel 22 is obtained by beforehand subtracting the data length corresponding to the HG delay Aij from the preamble data length Nwj.

Assume that data (write NRZ data) has been transferred from the HDC 50 to the write channel 22, in the order of the preamble data, sync byte (SB), user data, ECC, Viterbi control data (VTB) and write pad data (WPD). At this time, in the write channel 22, the operation of outputting the preamble data to the head 12-i (Hi) is performed. This operation is continued until the SM generator 223 in the write channel 22 detects the sync byte (SB) in the data transferred from HDC 50. Since the data length corresponding to the write path delay time is WPL, the data length of the preamble data output from the write channel 22 to the head 12-i (Hi) becomes (Nwj−Aij+WPL) (see FIG. 11F). As aforementioned, the write gate WG is turned on after the period corresponding to the HG delay Aij has elapsed from "the time of detecting the end of the $p^{th}$ servo region 110"+aj. As a result, the data length of the preamble data actually recorded as the preamble 31 on the disk 11 becomes (Nwj−Aij+WPL) (see FIG. 11I). On the other hand, in the prior art, the data length of preamble data output from the write channel to the head is (Nwj+WPL), and a format made in light of the maximum HG length is used. Accordingly, in the prior art, the data length of preamble data actually recorded on the disk 11 is not less than (Nwj+WPL). In other words, in the embodiment, the data length of the preamble 31 recorded on the disk 11 can be made shorter than in the prior art by at least the preamble data portion just after the $p^{th}$ servo region 110, the at least the preamble data portion corresponding to the HG delay Aij. Thus, the formatting efficiency of the disk 11 can be enhanced.

As described above, the write gate WG corresponding to the first sector is turned on after the period corresponding to the HG delay Aij has elapsed from "the time of detecting the end of the $p^{th}$ servo region 110"+aj. Accordingly, when the write gate WG is turned on, the write head 122 is deviated from the read head 121 toward the $p^{th}$ servo region 110 by the length corresponding to the HG delay Aij. Aij represents an optimized HG delay peculiar to the zone Zj and head Hi to which data-to-be-written sector belongs. This being so, in the case of writing data to the first sector based on the write gate WG, the preamble data is recorded in a position deviated by the distance corresponding to the period aj from the end of the $p^{th}$ servo region 110 toward the $(p+1)^{th}$ servo region 110. Therefore, there is no danger of the end portion of the servo data recorded in the $p^{th}$ servo region 110 being overwritten by the leading portion of the preamble data recorded on the first sector of the disk 11.

Referring now to the timing charts of FIGS. 11A and 11G to 11J, a description will be given of the operation for reading the data written to the first sector just after the $p^{th}$ servo region 110 (SV#p). Firstly, the DSP generator 501 outputs the 1st DSP at the time deviated by the period aj from the time corresponding to the end of the $p^{th}$ servo region 110 (SV#p). The DSP (1st DSP) output from the DSP generator 501 is used as a read DSP (see FIG. 11G). Based on the read DSP (1st DSP), the RG generator 505 turns on the read gate RG (see FIG. 11H) indicating the timing of reading data from a sector (first sector). Upon turn-on of the read gate, the SM detector 214 of the read channel 21 starts the detection of a sync mark (SM) in the output data of the PR channel 213. Upon detection of the sync mark (SM) by the SM detector 214, the Viterbi detector 215 processes the data equalized by the PR channel 213, using the Viterbi algorithm, thereby decoding the RLL data. The RLL decoder 216 decodes (converts), into original code data, the RLL data decoded by the Viterbi detector 215. The RLL decoder adds a sync byte (SB) to the leading portion of the decoded code data. The data with the sync byte (SB) (i.e., NRZ data containing user data and an ECC) is transferred to the HDC 50.

The SB detector 53 of the HDC 50 detects the sync byte (SB) attached to the NRZ data (see FIG. 11J) that is output from the RLL decoder 216 and contains the user data and ECC. After that, the ECC circuit 54 corrects an error in the user data contained in the NRZ data, based on the ECC subsequent to the user data. The user data having its error corrected by the ECC circuit 54 is transferred as read data to the host 60.

In the embodiment, the invention is applied to an HDD (magnetic disk drive), but is also applicable to other disk storage devices, such as magneto-optical disk drives. It is sufficient if the disk storage devices incorporate a composite head including a read head and write head.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of measuring a head gap length of a composite head, for use in a disk storage device with the composite head, the composite head including a read head used to read data from a disk, and a write head separate from the read head in a circumferential direction of the disk and used to write data to the disk, a disk format being applied to the disk, the disk format being constructed such that servo regions which record servo data are dispersively arranged at regular intervals in the circumferential direction of the disk, a region between a pair of adjacent ones of the servo regions being assigned as a data region in which a plurality of data sectors are arranged, the method comprising:

writing, in accordance with a write gate signal generated by a write gate generator, to the disk, sector data containing preamble data, a sync mark and user data, using the write head of the composite head, the write gate signal indicating a period in which sector data is written to the disk;

reading, in accordance with a read gate signal generated by a read gate generator, the sector data from the disk, using the read head of the composite head, the read gate signal indicating a period in which the sector data is read from the disk;

detecting the sync mark in the sector data read by the read head, using a read circuit;

delaying, in a particular mode for measurement of the head gap length of the composite head, timing of generation of the write gate signal by the write gate generator relative to reference timing by a period corresponding to an allowable maximum head gap length, the reference timing being determined from a time corresponding to an end of one of the servo regions, the one servo region being located just before the data region of the disk into which the sector data is written;

measuring, in the particular mode, a data length of the preamble data as a read preamble data length, the read preamble data length corresponding to a period ranging from a time at which the read gate signal is asserted, to a time at which the read circuit detects the sync mark;

determining, in the particular mode, the head gap length of the composite head based on the measured read preamble data length, a write preamble data length, a write path delay and a read path delay, the write preamble data length being a data length of the preamble data contained in the sector data to be written to the disk, the write path delay being a data length corresponding to a signal delay time in the write circuit, the read path delay being a data length corresponding to a signal delay time in the read circuit;

storing, into a nonvolatile storage, head gap information indicating the determined head gap length;

shortening, before writing sector data to the disk in a normal mode, the data length of the preamble data to be contained in the sector data by a data length corresponding to the head gap length indicated by the head gap length information stored in the nonvolatile storage; and delaying, in the normal mode, timing of generation of the write gate signal by the write gate generator by a period corresponding to the head gap length indicated by the head gap length information stored in the nonvolatile storage.

2. The method according to claim 1, wherein the head gap length is determined from the following equation:

head gap length=write preamble data length+write path delay−(read preamble data length−read path delay).

3. The method according to claim 1, further comprising delaying, in the particular mode, timing of generation of the read gate signal by the read gate generator relative to the reference timing by a period corresponding to the allowable maximum head gap length.

4. The method according to claim 1, wherein the measuring includes measuring a period ranging from a time when the read gate signal is asserted, to a time when the read circuit detects the sync mark.

5. The method according to claim 1, wherein:
the disk has two disk surfaces serving as recording surfaces which record data; and
the composite head opposes one of the two disk surfaces of the disk, and another composite head opposes the other disk surface,
and further comprising causing each of the composite heads to perform a procedure for measurement of the head gap length.

6. The method according to claim 5, further comprising:
storing, into a nonvolatile storage in relation to the respective composite heads, head gap length information indicating a head gap length measured for each of the composite heads;
generating preamble data to be written to the disk before writing sector data to the disk after storing the head gap information for each of the composite heads into the nonvolatile storage, the preamble data to be written to the disk having a data length shorter than a predetermined data length by a data length corresponding to the measured head gap length of the composite heads used to write the sector data, the measured head gap length of the composite heads being indicated by head gap information stored in the nonvolatile storage in relation to the composite heads; and
delaying, during writing sector data containing the generated preamble data, a write gate signal relative to the read gate signal by a period corresponding to the measured head gap length of the composite heads, the write gate signal indicating a period of writing sector data to the disk.

7. The method according to claim 1, wherein:
the disk has a disk surface serving as a recording surface which records data; and
the recording surface of the disk is divided into a plurality of radially extending zones and is managed in units of zones, a number of data sectors arranged in the data regions being different between the zones,
and further comprising causing each of the composite heads to execute a procedure for measurement of the head gap length.

8. The method according to claim 7, further comprising:
storing, into a nonvolatile storage in relation to the respective zones, head gap length information indicating a head gap length measured for each of the zones;
generating preamble data to be written to the disk before writing sector data to the disk after storing the head gap information for each of the zones into the nonvolatile storage, the preamble data to be written to the disk having a data length shorter than a predetermined data length by a data length corresponding to the measured head gap length of one of the zones, a data sector to which the sector data is written belonging to the one of the zones, the measured head gap length of each of the zones being indicated by head gap information stored in the nonvolatile storage in relation to the zones; and
delaying, during writing sector data containing the generated preamble data, a write gate signal relative to the read gate signal by a period corresponding to the measured head gap length of one of the zones, a data sector to which the sector data is written belonging to the one of the zones, the write gate signal indicating a period of writing sector data to the disk.

9. The method according to claim 1, wherein:
the disk has two disk surfaces serving as recording surfaces which record data;
each of the recording surfaces of the disk is divided into a plurality of radially extending zones and is managed in units of zones, a number of data sectors arranged in the data regions being different between the zones; and
the composite head opposes one of the two disk surfaces of the disk, and another composite head opposes the other disk surface,
and further comprising causing each of the composite heads to execute a procedure for measurement of the head gap length in units of zones.

10. The method according to claim 9, further comprising:
storing, into a nonvolatile storage in relation to the respective composite heads and the respective zones, head gap length information indicating a head gap length measured for each of the composite heads and the zones;
generating preamble data to be written to the disk before writing sector data to the disk after storing, into the nonvolatile storage, the head gap information for each of the zones and the composite heads, the preamble data to be written to the disk having a data length shorter than a predetermined data length by a data length corresponding to the head gap length determined from one of the composite heads and one of the zones, the one of the composite heads being used to write the sector data, a data sector to which the sector data is written belonging to the one of the zones, the head gap length determined from the composite heads and the zones being indicated by head gap information stored in the nonvolatile storage in relation to the composite heads and the zones; and
delaying, during writing sector data containing the generated preamble data, a write gate signal relative to the read gate signal by a period corresponding to the head gap length determined from one of the composite heads and one of the zones, the write gate signal indicating a period of writing sector data to the disk.

11. A disk storage apparatus which employs a disk format constructed such that servo regions which record servo data are dispersively arranged at regular intervals in the circumferential direction of the disk, a region between a pair of adjacent ones of the servo regions being assigned as a data region in which a plurality of data sectors are arranged, the apparatus comprising:
a composite head including a read head used to read data from a disk, and a write head used to write data to the disk, the read head and the write head being separate from each other in a circumferential direction of the disk;
a nonvolatile storage which stores head gap length information indicating a head gap length of the composite head;
a write gate generator which generates a write gate signal indicating a period in which sector data is written to the disk;
a read gate generator which generates a read gate signal indicating a period in which the sector data is read from the disk;
a preamble generator which generates preamble data to be written to the disk;
a controller configured to control the preamble generator to make a data length of the preamble data shorter than a preset data length by a data length corresponding to the head gap length indicated by the head gap length information stored in the nonvolatile storage;
a write circuit which performs, in accordance with the write gate signal, a write operation to write the sector data to the disk using the write head of the composite head, the sector data containing the preamble data generated by the preamble generator, a sync mark and user data;
a read circuit which performs, in accordance with the read gate signal, a read operation to read the sector data from the disk using the read head of the composite head, the read circuit including a sync mark detector which detects the sync mark in the sector data read by the read head;

a delay circuit which delays, in a normal mode, timing of generation of the write gate signal by the write gate generator relative to the read gate signal by a period corresponding to the head gap length indicated by the head gap length information stored in the nonvolatile storage;

an adjuster which delays, in a particular mode for measurement of the head gap length of the composite head, timing of generation of the write gate signal by the write gate generator relative to reference timing by a period corresponding to an allowable maximum head gap length, the reference timing being determined from a time corresponding to an end of one of the servo regions, the one servo region being located just before the data region of the disk into which the sector data is written;

a measuring circuit configured to measure a data length of the preamble data as a read preamble data length in the particular mode, the data length of the preamble data corresponding to a period ranging from a time, indicated by the read gate signal, when reading of sector data is started, to a time when a sync mark is detected in the sector data by the sync mark detector;

a determination circuit configured to determine, in the particular mode, the head gap length of the composite head from the read preamble data length measured by the measuring circuit, a predetermined write preamble data length, a write path delay and a read path delay, the predetermined write preamble data length being a data length of the preamble data generated by the preamble generator, the write path delay being a data length corresponding to a signal delay time in the write circuit, the read path delay being a data length corresponding to a signal delay time in the read circuit; and means for storing, into the nonvolatile storage, head gap information indicating the head gap length determined by the determination circuit, and wherein:

the delay circuit delays, in the normal mode, timing of generation of the write gate signal by the write gate generator by a period corresponding to the head gap length indicated by the head gap length information stored in the nonvolatile storage; and the controller performs control for shortening the data length of the preamble data generated by the preamble generator by a data length corresponding to the head gap length indicated by the head gap length information stored in the nonvolatile storage.

12. The disk storage apparatus according to claim 11, wherein the measuring circuit includes a counter which measures, by counting, a period ranging from a time when the read gate signal is asserted, to a time when the sync mark detector detects the sync mark.

* * * * *